United States Patent [19]

Fasterding et al.

[11] 4,359,656
[45] Nov. 16, 1982

[54] VOLTAGE REGULATOR FOR GENERATORS

[75] Inventors: Henning Fasterding, Markgröningen; Herbert Franz, Stuttgart; Gerhard Walker, Möglingen, all of Fed. Rep. of Germany

[73] Assignee: Robert Bosch GmbH, Stuttgart, Fed. Rep. of Germany

[21] Appl. No.: 204,740

[22] Filed: Nov. 7, 1980

[51] Int. Cl.³ ............................................. H02K 11/00
[52] U.S. Cl. .................................. 310/68 R; 310/71; 310/239
[58] Field of Search ............ 310/68 R, 89, 68 D, 310/239, 112, 232, 71, 231, 239, 248, 249; 322/28

[56] References Cited

U.S. PATENT DOCUMENTS

| 3,496,394 | 2/1970 | Blacke | 310/239 |
|-----------|--------|--------|---------|
| 3,538,362 | 11/1970 | Cheetham | 310/71 |
| 3,553,504 | 1/1971 | Blacke | 310/68 D |
| 3,586,892 | 6/1971 | Sato | 310/68 R |
| 3,731,126 | 5/1973 | Hagenlocher | 310/239 |
| 4,100,440 | 7/1978 | Binder | 310/68 D |
| 4,197,473 | 4/1980 | Allport | 310/239 |

FOREIGN PATENT DOCUMENTS 1088375 10/1957 United Kingdom ............. 310/68 D

*Primary Examiner*—R. Skudy
*Attorney, Agent, or Firm*—Frishauf, Holtz, Goodman & Woodward

[57] ABSTRACT

Bus strips of steel or brass, rivetted where necessary to the brush holder and to a flat plate member integral therewith serve to connect the terminals of the voltage regulator mounted on the flat plate to the brush holder and to terminals for positive and negative voltage, the exicitor winding of a generator and the D+ and D− terminals. The bus strips are soldered or welded to the terminals they connect so as to provide reliable connections for the life of the device. The negative terminal connection includes a bushing in a mounting eye of the flat plate and the positive terminal is provided as a pressure contact.

7 Claims, 6 Drawing Figures

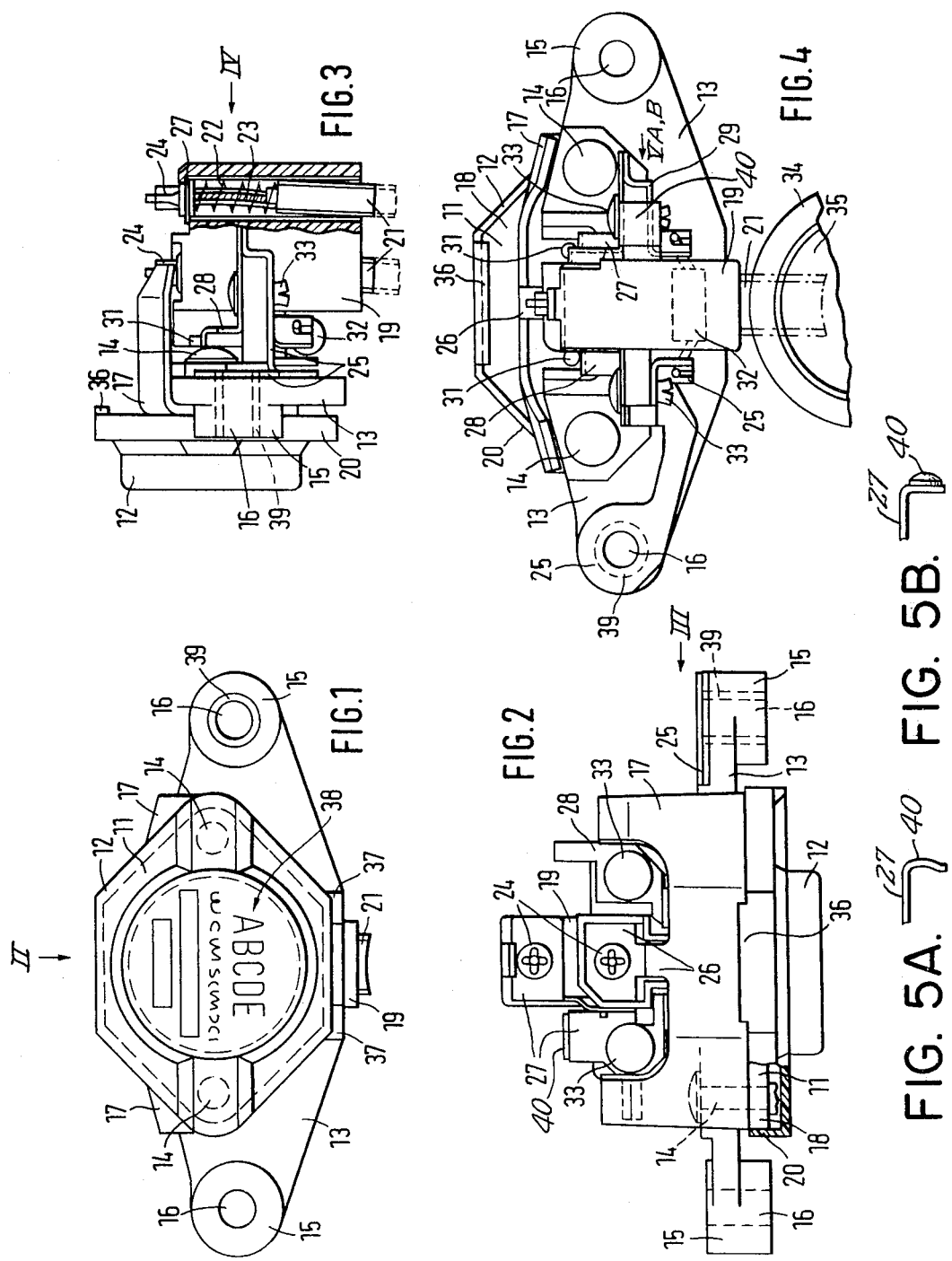

VOLTAGE REGULATOR FOR GENERATORS

This invention concerns a voltage regulator construction incorporating a brush holder, suitable for a component of a generator of which the voltage is regulated, and particularly for a generator designed for vehicular service. Such voltage regulators usually operate to regulate the output voltage of a generator, which may be an alternator-rectifier combination, by switching in more or less frequently, for more or less time, the excitation current of the generator. The battery voltage or an output voltage of a generator serves as the reference magnitude for the switching operation.

A variety of casing shapes and types of fastening and mounting have been found suitable for such voltage regulators. It is known to provide a voltage regulator in a casing that is similar to a transistor casing, to combine the casing with a brush holder and to mount the unitary components so provided on or in the generator casing. The electrical connection of the terminals of the voltage regulator with those of the brush holder and of the generator have up to now been conventionally provided by plug and socket connectors. Such connections are somewhat unreliable and, in particular, after replacement of the voltage regulator a good connection cannot be assured.

SUMMARY OF THE INVENTION

It is an object of the invention to provide more reliable electrical connections between the voltage regulator and the brush holder and the various terminals for connection to the generator.

Briefly, bus strips of a tough metal such as steel or brass are provided for electrical connection of the terminals of the voltage regulator with the several terminals for the brushes, the positive voltage supply and the negative voltage supply. In particular, these bus strips are at least in part applied externally to the brush holder and they are welded or soldered to the terminals they connect. Preferably the negative supply bus strip connects with a bushing inserted in a mounting eye of a flat plate formed integrally with the brush holder and carrying the casing for the voltage regulator, while the positive supply strip connects with a terminal in the form of a pressure contact.

The provision of bus strips for connections according to the invention has the advantage of providing reliable connections between all of the connected terminals. Welding or soldering of the connections to the bus strips is particularly advantageous since the electric connection is thereby made reliable for the entire life of the voltage regulator and undesirable separation of or insertions into the voltage regulator and brush holder unit is prevented. The provision of the bushing in one of the mounting holes of the unit provides a good conducting connection to chassis ground and furthermore prevents the seizing of the fastening of the component.

SHORT DESCRIPTION OF THE DRAWING

The invention is further described by way of illustrative example with reference to the annexed drawing, in which:

FIG. 1 is a view of a voltage regulator and brush holder unit according to the invention as seen facing the cover of the voltage regulator;

FIG. 2 is a view of the device of FIG. 1 while looking towards the closed ends of the brush holders;

FIG. 3 is a view of the same device from one side of the brush holder and edgewise to the voltage regulator;

FIG. 4 is a view of the same device looking in the direction opposite to that in which FIG. 1 is seen, and "FIGS. 5A and 5B" are details of pressure contacts for a bus strip.

Arrows identified by roman numerals provided for each figure indicate the direction of view for the corresponding other figures.

DESCRIPTION OF THE ILLUSTRATIVE EMBODIMENT

The actual casing 11 of the voltage regulator is shown in broken lines in FIG. 1 because it is covered by a protective cap 12 of insulating material. The casing 11 on which the protective cap is snapped in the manner described below, is mounted on a flat plate 13, for example by means of rivets 14. As shown in FIGS. 1, 2 and 4, the flat plate 13 extends beyond the casing 11 and its cover 12 in opposite directions and at each end of the respective extensions there is a mounting eye 15 of circularly cylindrical shape provided with a central bore 16. The cylindrical passages 16 serve for insertion of fastening means by which the voltage regulator and brush holder unit can be fastened to the casing of the generator. A cooling plate 17 is interposed between the flat plate 13, on the one hand, and the casing 11 with its cover 12, on the other.

In FIG. 2, the casing 11 is shown cut away so that the base plate 13 of the casing 11 as well as the head of a rivet 14 are visible. The brush holder 19 is also easy to recognize in FIG. 2. In the several figures of the drawing the same components are designated by the same reference numerals.

In FIG. 3 the brush holder 19 is shown partly in section. On this account the carbon brushes 21 guided in the brush holder are readily recognizable. Each carbon brush is urged out of the brush holder 19 by a helical spring 22. Litz wire 23 serves to lead current to and from the brushes 21. The Litz wire leads 23 are held at the closed ends of the holder 19 by means of spring clips 24 and soldered. In FIG. 3 it can be seen that the cooling plate 17 is bent around the mounting plate 13 more or less at right angles away from the casing 11 and its protective cap 12.

It can further be seen in FIG. 3 that the individual terminals of the voltage regulator and brush holder unit are connected by bus strips. In particular these comprise a bus strip 25 for the negative terminal, a bus strip 27 for the positive terminal, a bus strip 26 for the field or exciter winding terminal DF and still another bus strip 28 for the D-terminal. The regulator terminal pins 31 project out of the casing 11 and are preferably welded or soldered to the appropriate bus strips. The bus strips are made of steel, preferably V2A steel, or brass, that can be tinned, manufactured and so designed that they can take up mechanical tolerance compensation and the thermal expansion that arises during operation of the generator.

In FIG. 4 one more bus strip 29 can be seen, the one that leads to the D+ terminal. The conventional designations D+ and D− are well known in alternator-rectifier practice regarding vehicular installations.

The voltage regulator and brush holder unit can also include resistor 32, that can readily be soldered in place between angular bends of the respective bus strips 25 and 29. So far as is necessary the bus strips 25, 28, 27 and 29 are fastened to the brush holder by means of rivets 33 to apply these strips firmly against the brush holder body. In operation of the generator the brushes 21 ride on slip rings 34 that are fixed in an insulated manner on a rotor shaft 35 that is only partly shown in FIG. 4.

It can be seen from FIGS. 3 and 4 that the protective cap 12 is provided with catch ridges 36. The catch ridges 36 grasp around the base plate 13 of the casing 11 so as to hold the protective cap 12 firmly on the casing 11. It has been found convenient to provide two catch ridges 36 on opposite sides of the casing 11 and to make them of different length. The longer ridge 36 can be seen uncovered in FIG. 4. It is further convenient to provide stop projections 37 on the side of the plate 13 formed with the brush holder 19 that faces the casing 11. The stops 37 are arranged on either side of the shorter catch ridge 36 and the spacing between the stops 37 is such that the longer catch ridge 36 cannot be pressed between these stops. By this precaution it is provided that the cap 12 can be fastened on the casing 11 in only one position. It is thus assured that the legend 38 providing maintenance information for the generator will always be upright for a reader.

In one of the eyes 15, particularly the one where the bus strip 25 for the negative terminal is present (assuming a generator with negative terminal grounded) a metal bushing 39 can be inserted. This bushing 39 provides a connection of good conductivity to the generator frame or casing and prevents a seizing of the bond either by pulling one of the mounting screws or in operation of the generator.

The protective cap 12, as shown particularly in FIG. 3, has a rim 20 that encircles the base plate 18 of the casing 11.

The positive voltage terminal to which the bus strip 27 connects is preferably provided as a pressure contact 40 for an external connection as shown in FIGS. 5A and 5B.

Although the invention has been described with reference to a particular illustrative embodiment, it will be understood that modifications and variations are possible within the inventive concept.

We claim:

1. A voltage regulator for a generator suitable for vehicular service having its circuit components contained within a casing similar to a transistor casing, and being combined on a common base member with a brush holder and further being provided with connections at least for a negative lead, a generator exciter winding lead and a positive lead, further comprising the improvement which consists in that:

said casing (11) is mounted on a flat plate (13) having circularly cylindrical mounting eyes (15) and formed integrally with and adjacent to the brush holder (19);

bus strips are provided for electrical connection of terminals of the voltage regulator and brushholder;

a metallic bushing (39) is set within one of said eyes and connects with said negative voltage supply bus strip (27), and said positive voltage supply bus strip (27) connects with a terminal in the form of a pressure contact (40).

2. A voltage regulator as defined in claim 1 in which said bus strips (25-29) are at least in part externally applied to said brush holder (19).

3. A voltage regulator as defined in claim 2 in which said bus strips (25-29) are made of steel.

4. A voltage regulator as defined in claim 2 in which said bus strips (25-29) are made of brass.

5. A voltage regulator as defined in claim 1 in which said bus strips (25-29) are welded to the terminals to which they connect.

6. A voltage regulator as defined in claim 1 in which said bus strips (25-29) are soldered to the terminals to which they connect.

7. A voltage regulator as defined in claim 1 in which said bushing (39) has a length equal to the axial dimension of the eye (15) in which it is inserted.

* * * * *